United States Patent
Aoki et al.

(10) Patent No.: US 10,668,524 B2
(45) Date of Patent: Jun. 2, 2020

(54) BINDER COMPOSITION FOR MOLDING, BLENDED AGGREGATE FOR MOLDING, AND MOLD

(71) Applicant: SINTOKOGIO, LTD., Aichi (JP)

(72) Inventors: Tomohiro Aoki, Aichi (JP); Yusuke Kato, Aichi (JP)

(73) Assignee: Sintokogio, Ltd., Aichi (JP)

( * ) Notice: Subject to any disclaimer, the term of this patent is extended or adjusted under 35 U.S.C. 154(b) by 0 days.

(21) Appl. No.: 16/089,497

(22) PCT Filed: Feb. 14, 2017

(86) PCT No.: PCT/JP2017/005340
§ 371 (c)(1),
(2) Date: Sep. 28, 2018

(87) PCT Pub. No.: WO2017/212684
PCT Pub. Date: Dec. 14, 2017

(65) Prior Publication Data
US 2019/0105703 A1   Apr. 11, 2019

(30) Foreign Application Priority Data
Jun. 6, 2016   (JP) ................................. 2016-112861

(51) Int. Cl.
B22C 1/18  (2006.01)
B22C 1/10  (2006.01)
C04B 12/04  (2006.01)
B22C 9/02  (2006.01)

(52) U.S. Cl.
CPC ................ B22C 1/188 (2013.01); B22C 1/10 (2013.01); B22C 1/18 (2013.01); B22C 9/02 (2013.01); C04B 12/04 (2013.01)

(58) Field of Classification Search
CPC .. B22C 1/188; B22C 1/10; B22C 1/18; B22C 9/02; C04B 12/04
See application file for complete search history.

(56) References Cited

U.S. PATENT DOCUMENTS

| 3,725,095 A * | 4/1973 | Weldman ............... A01N 25/16 |
| | | 106/603 |
| 4,347,890 A | 9/1982 | Ailin-Pyzik et al. |
| 4,432,798 A * | 2/1984 | Helferich ................. B22C 1/18 |
| | | 106/38.3 |
| 2010/0326620 A1* | 12/2010 | Muller .................... B22C 1/188 |
| | | 164/528 |
| 2016/0136724 A1 | 5/2016 | Deters et al. |
| 2016/0167113 A1* | 6/2016 | Lee .......................... B22C 1/02 |
| | | 164/271 |

FOREIGN PATENT DOCUMENTS

| CA | 2 910 387 A1 | 12/2015 |
| CN | 103974789 A | 8/2014 |
| CN | 105127360 A | 12/2015 |
| GB | 1 532 847 | 11/1978 |
| JP | 07018202 A * | 1/1995 |
| JP | 2013-111602 | 6/2013 |
| JP | 2016-215221 | 12/2016 |
| WO | WO 2005/023457 A1 | 3/2005 |
| WO | WO 2007/058254 A1 | 5/2007 |
| WO | WO 2013/080016 A1 | 6/2013 |

OTHER PUBLICATIONS

International Search Report issued by the Japan Patent Office in corresponding International Application No. PCT/JP2017/005340, dated Apr. 4, 2017.
Office Action for corresponding CN Application No. 201780008417.4 dated Nov. 29, 2019.
Extended European Search Report for correspondence EP Application No. 17809868.7 dated Jan. 2, 2020.

* cited by examiner

*Primary Examiner* — Anthony J Green
(74) *Attorney, Agent, or Firm* — Finnegan, Henderson, Farrabow, Garrett & Dunner, LLP (57) ABSTRACT

To provide a binder composition for molding, by which a mold made of aggregate has an excellent resistance to moisture. The binder composition for molding contains a water-soluble binder and at least one kind of lithium salt that is selected from a group of lithium silicate, lithium oxide, lithium hydroxide, lithium carbonate, lithium bromide, lithium chloride, lithium nitrate, and lithium nitrite.

15 Claims, 4 Drawing Sheets

BINDER COMPOSITION FOR MOLDING, BLENDED AGGREGATE FOR MOLDING, AND MOLD

TECHNICAL FIELD

The present invention relates to a binder composition for molding, blended aggregate for molding, and a mold.

BACKGROUND ART

Conventionally, a method has been disclosed wherein a water-soluble binder, such as starch, is used as a binder for molding. By that method aggregate and the binder are agitated so that the blended aggregate foams, to thereby form a mold. Since starch or the like is used, the advantages obtained by that method are that substantially no unpleasant odor or gas is generated while molding or while pouring molten metal into the mold and that the binding power of the binder is weakened by means of heat while casting takes place, so that the aggregate can be easily removed from a cast (for example, see Patent Literature 1).

A method for molding has been also disclosed wherein by using liquid glass, i.e., sodium silicate, as the water-soluble binder, generation of any unpleasant odor or gas is further reduced (for example, see Patent Literature 2).

By the method for casting that uses the blended aggregate that is foamed after the aggregate and the water-soluble binder are agitated, the mold may be weakened by absorbing moisture. The higher the humidity around the mold, the more the strength of it decreases. If the mold of which the strength decreases were used for casting, it, or a part of it, would break during the transportation of it or before the molten metal that has been poured solidifies. Thus, the resistance to moisture of the mold has been required to be increased.

The present invention aims to provide a binder composition for molding and blended aggregate for molding, by which a mold that has an excellent resistance to moisture can be obtained. It also aims to provide a mold that has an excellent resistance to moisture.

PRIOR-ART PUBLICATION

Patent Literature

[Patent Literature 1]
 International Publication No. WO 2005/023457
[Patent Literature 2]
 Japanese Patent Laid-open Publication No. 2013-111602

DISCLOSURE OF INVENTION

The above problems can be resolved by the following means.
<1> A binder composition for molding containing a water-soluble binder and at least one kind of lithium salt that is selected from a group of lithium silicate, lithium oxide, lithium hydroxide, lithium carbonate, lithium bromide, lithium chloride, lithium nitrate, and lithium nitrite.
<2> The binder composition for molding that is described in <1> containing the at least one kind of the lithium salt that is selected from a group of the lithium silicate and the lithium hydroxide.
<3> The binder composition for molding that is described in <1> containing the lithium silicate as the lithium salt, wherein a mole ratio of the lithium silicate at $SiO_2/Li_2O$ equals 3.0 or more and 8.0 or less.
<4> The binder composition for molding that is described in <1> containing the lithium silicate as the lithium salt, wherein a mole ratio of the lithium silicate at $SiO_2/Li_2O$ equals 3.0 or more and 5.0 or less.
<5> The binder composition for molding that is described in <1> containing at least one kind of the water-soluble binder that is selected from a group of sodium silicate and potassium silicate.
<6> The binder composition for molding that is described in any of <1> to <5> further containing a water-soluble foaming agent.
<7> The binder composition for molding that is described in <6> containing a surfactant as the water-soluble foaming agent.
<8> The binder composition for molding that is described in <7> containing at least one kind of the surfactant that is selected from a group of an anionic surfactant, a non-ionic surfactant, and an amphoteric surfactant.
<9> Blended aggregate for molding containing aggregate, a water-soluble binder, and at least one kind of lithium salt that is selected from a group of lithium silicate, lithium oxide, lithium hydroxide, lithium carbonate, lithium bromide, lithium chloride, lithium nitrate, and lithium nitrite.
<10> The blended aggregate for molding that is described in <9> containing the at least one kind of the lithium salt that is selected from a group of lithium silicate and lithium hydroxide.
<11> The blended aggregate for molding that is described in <9> containing the lithium silicate as the lithium salt, wherein a mole ratio of the lithium silicate at $SiO_2/Li_2O$ equals 3.0 or more and 8.0 or less.
<12> The blended aggregate for molding that is described in <9> containing the lithium silicate as the lithium salt, wherein a mole ratio of the lithium silicate at $SiO_2/Li_2O$ equals 3.0 or more and 5.0 or less.
<13> The blended aggregate for molding that is described in <9> containing at least one kind of the water-soluble binder that is selected from a group of sodium silicate and potassium silicate.
<14> The blended aggregate for molding that is described in any of <9> to <13> further containing a water-soluble foaming agent.
<15> The blended aggregate for molding that is described in <14> containing a surfactant as the water-soluble foaming agent.
<16> The blended aggregate for molding that is described in <15> containing at least one kind of the surfactant that is selected from a group of an anionic surfactant, a non-ionic surfactant, and an amphoteric surfactant.
<17> The blended aggregate for molding that is described in <9>, wherein a content of the lithium salt equals 0.01 mass % or more and 1 mass % or less in comparison to a content of the aggregate.
<18> The blended aggregate for molding that is described in <9>, wherein a content of the water-soluble binder equals 0.1 mass % or more and 20 mass % or less in comparison to a content of the aggregate.
<19> The blended aggregate for molding that is described in <14>, wherein a content of the foaming agent equals 0.005 mass % or more and 0.1 mass % or less in comparison to a content of the aggregate.
<20> The blended aggregate for molding that is described in <9> including bubbles that are generated by foaming and having a viscosity that equals 0.5 Pa·S or more and ·0.10 Pa·S or less.

<21> A mold containing aggregate, a water-soluble binder, and at least one kind of lithium salt that is selected from a group of lithium silicate, lithium oxide, lithium hydroxide, lithium carbonate, lithium bromide, lithium chloride, lithium nitrate, and lithium nitrite.

By the present invention, a binder composition for molding and blended aggregate for molding can be provided, by which a mold that has an excellent resistance to moisture can be obtained. Further, a mold that has an excellent resistance to moisture can be provided.

The basic Japanese patent application, No. 2016-112861, filed Jun. 6, 2016, is hereby incorporated by reference in its entirety in the present application.

The present invention will become more fully understood from the detailed description given below. However, that description and the specific embodiments are only illustrations of the desired embodiments of the present invention, and so are given only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, under the doctrine of equivalents, a part of the present invention.

The use of the articles "a," "an," and "the" and similar referents in the specification and claims are to be construed to cover both the singular and the plural form of a noun, unless otherwise indicated herein or clearly contradicted by the context. The use of any and all examples, or exemplary language (e.g., "such as") provided herein is intended merely to better illuminate the invention, and so does not limit the scope of the invention, unless otherwise stated.

MODE FOR CARRYING OUT THE INVENTION

Below, the embodiments of the present invention are discussed in detail.

The binder composition for molding of the present invention contains a water-soluble binder and at least one kind of lithium salt that is selected from the group that is listed below:

lithium silicate ($Li_2O_3Si$), lithium oxide ($Li_2O$), lithium hydroxide (LiOH), lithium carbonate ($Li_2CO_3$), lithium bromide (LiBr), lithium chloride (LiC), lithium nitrate ($LiNO_3$), and lithium nitrite ($LiNO_2$).

The binder composition for molding of the present invention is mixed with aggregate to be used as blended aggregate for molding, which is a raw material for a mold (a mold made of aggregate). Herein a "mold" is to be understood to include a core.

The blended aggregate for molding of the present invention contains the aggregate, the water-soluble binder, and at least one kind of the lithium salt that is selected from the group that is listed above.

When the blended aggregate for molding of the present invention is prepared, the water-soluble binder and the at least one kind of lithium salt that is selected from the group that is listed above (hereafter, "the specific lithium salt") may be preliminarily mixed and then the mixture is mixed with the aggregate, or the aggregate and either the water-soluble binder or the specific lithium salt may be preliminarily mixed and then the mixture is mixed with the specific lithium salt or the water-soluble binder, or the three materials may be mixed together one time.

By a method for casting using a mold that contains the aggregate and the water-soluble binder, the strength of the mold may decrease when, for example, the mold is kept under high humidity for a long time. In some cases a liquid for processing that contains an aqueous vehicle, such as a water-based mold wash, may be applied to the mold by means of dipping, etc. The strength of a mold that absorbs water from such an aqueous vehicle may decrease. A mold having a decreased strength may break during the transportation of it or before the molten metal that has been poured into it solidifies. Thus, the resistance to moisture, as well as the resistance to water, of such a mold has had to be increased.

In contrast, both the binder composition for molding and the blended aggregate for molding of the present invention have an excellent resistance to moisture and to water, since they have the above compositions. The reasons for that effect are not clear, but are estimated to be the following:

If the water-soluble binder that is contained in the mold is a metallic salt wherein the cation is substituted by a $Li^+$ ion, for example, sodium silicate ($Na_2O \cdot nSiO_2$) or potassium silicate ($K_2O \cdot nSiO_2$), it may become a lithium metal salt by being substituted by a $Li^+$ ion that is generated from the specific lithium salt. When the reaction ends, thereafter excellent resistances to moisture and to water can be provided. As discussed above, the mold of the present invention may have excellent resistances to moisture and to water.

Next, the binder composition for molding and the composition of the blended aggregate for molding of the present invention are discussed in detail.

Specific Lithium Salt

By the present invention at least one kind of lithium salt that is selected from the following group is contained as the specific lithium salt: lithium silicate ($Li_2O_3Si$), lithium oxide ($Li_2O$), lithium hydroxide (LiOH), lithium carbonate ($Li_2CO_3$), lithium bromide (LiBr), lithium chloride (LiC), lithium nitrate ($LiNO_3$), and lithium nitrite ($LiNO_2$).

Among these kinds of lithium salt, the lithium silicate and the lithium hydroxide are preferable to obtain a mold that has excellent resistances to moisture and to water, and the lithium silicate is more preferable.

To obtain a mold that has excellent resistances to moisture and to water, a lithium silicate ($Li_2O_3Si$) having a mole ratio ($SiO_2/Li_2O$) that equals 3.0 or more and 8.0 or less is preferable, and one having a mole ratio that equals 3.0 or more and 5.0 or less is more preferable.

The content of the specific lithium salt in comparison to that of the aggregate preferably equals 0.01 mass % or more and 1 mass % or less, and more preferably equals 0.05 mass % or more and 0.5 mass % or less, and further more preferably equals 0.1 mass % or more and 0.3 mass % or less. Since the amount of the specific lithium salt equals 0.01 mass % or more, a mold that has excellent resistances to moisture and to water can be obtained. Since it equals 1 mass % or less, the blended aggregate that has been foamed is prevented from having its viscosity deteriorate.

Aggregate

The aggregate of the present invention is not limited, and may be any known one. For example, the aggregate may be silica sand, alumina sand, olivine sand, chromite sand, zircon sand, mullite sand, or the like. Further, it may be synthetic aggregate (so called synthetic sand). Among these, the synthetic aggregate is preferable in that the strength of a mold is sufficient even if the content of the binder is reduced in comparison to that of the aggregate, and in that the aggregate can be regenerated at a high rate.

The grain fineness number of the aggregate of the present invention preferably equals 631 by JIS (300 by AFS) or less and 5 by JIS (3 by AFS) or more. It more preferably equals 355 by JIS (200 by AFS) or less and 31 by JIS (20 by AFS) or more. If the grain fineness number equals the above lower limit or is greater than it, then the fluidity becomes good, so that the filling properties for manufacturing a mold are improved. Further, if it equals the above upper limit or is less than it, then the air permeability in the mold can be kept at a good level.

By the present invention the grain fineness numbers are measured under JIS Z 2601-1933 Annex 2 (Methods for testing particle size of foundry molding sand).

The shapes of the aggregate of the present invention are not limited, and may be any shape, such as a circle, a square with rounded corners, a polygon, a cone, or the like. The circle is preferable in view of good fluidity so that the filling properties for manufacturing a mold are improved and in view of air permeability in the mold being well maintained.

Water-soluble Binder

The binder is contained so as to give power for binding to the aggregate so that the shape of a mold can be well maintained at room temperature and at the temperature of the molten metal being poured. The word "water-soluble" means that the material is soluble at room temperature (20° C.). It is preferable that the appearance of the mixture of it and pure water of the same amount is uniform at 1 atm (101.325 kPa) and at 20° C.

The water-soluble binder of the present invention is not limited, and may be any known one, such as sodium silicate (liquid glass), potassium silicate, ammonium silicate, orthophosphate, pyrophosphate, trimetaphosphate, polymetaphosphate, colloidal silica, colloidal alumina, alkyl silicate, or the like. Among these, the sodium silicate (liquid glass) and the potassium silicate are preferable so that the resistances to moisture and to water caused by the specific lithium salt can be effective.

Just one kind of, or two or more kinds of, the above water-soluble binders may be used.

The sodium silicate (liquid glass) preferably has a mole ratio (the ratio of molecules of $SiO_2$ to $Na_2O$) of 1.2 or more and 3.8 or less, more preferably 2.0 or more and 3.3 or less. If the mole ratio equals the lower limit or more, then the transformation of the liquid glass can be suppressed even when stored for a long time at a low temperature. In contrast, if it equals the upper limit or less, then the viscosity of the binder can be easily adjusted.

The content of the water-soluble binder in comparison to that of the aggregate of the present invention is preferably determined based on the kind of binder and the kind of aggregate. Specifically, it is preferably 0.1 mass % or more and 20 mass % or less, and more preferably 0.1 mass % or more and 10 mass % or less.

Water-soluble Foaming Agent

When a mold is manufactured by using the blended aggregate for molding of the present invention, the aggregate, the water-soluble binder, and the specific lithium salt are mixed and agitated to foam by using the water-soluble foaming agent. The blended aggregate that has foamed is preferably adjusted to improve the fluidity before manufacturing a mold. The word "water-soluble" means that the material is soluble at room temperature (20° C.). It is preferable that the appearance of the mixture of it and pure water of the same amount be uniform at 1 atm and at 20° C.

The water-soluble foaming agent has preferably a function as a binder. A binder that has foamability is preferable in view of effectively causing the above foaming in the blended aggregate. The water-soluble binder that has foamability may be, for example, a surfactant (specifically, an anionic surfactant, a non-ionic surfactant, an amphoteric surfactant, or the like), polyvinyl alcohol or its derivatives, saponin, starch or its derivatives, or other saccharides. The other saccharides may include, for example, 1) a polysaccharide, such as cellulose and fructose, 2) a tetrasaccharide, such as acarbose, 3) a trisaccharide such as raffinose and maltotriose, 4) a disaccharide, such as maltose, sucralose, and trehalose, and 5) a monosaccharide, such as glucose, fructose, and an oligosaccharide.

The anionic surfactant may include fatty acid sodium, monoalkyl sulfate, sodium dodecylbenzenesulfonate, sodium lauryl sulfate, sodium ether sulfate, or the like. The non-ionic surfactant may include polyoxyethylene alkyl ether, sorbitan fatty acid ester, alkyl polyglucoside, or the like. The amphoteric surfactant may include cocamidopropyl betaine, cocamidopropyl hydroxysultaine, lauryldimethylaminoacetic acid betaine, or the like.

Just one kind of, or two or more kinds of, the above foaming agents may be used.

The content of the water-soluble foaming agent in comparison to that of the aggregate of the present invention is preferably determined based on the kind of foaming agents and the kind of aggregate. For example, the total content of the anionic surfactant, the non-ionic surfactant, and the amphoteric surfactant, in comparison to that of the aggregate, is preferably 0.005 mass % or more and 0.1 mass % or less, and more preferably 0.01 mass % or more and 0.05 mass % or less. The total content of the polyvinyl alcohol and its derivatives, the saponin, the starch and its derivatives, and other saccharides (a group A of binders), in comparison to that of the aggregate, is preferably 0.1 mass % or more and 20.0 mass % or less, and more preferably 0.2 mass % or more and 5 mass % or less.

Other Compositions

In addition to the above, any known composition, such as a catalyst, a pro-oxidant, or the like, may be added to the blended aggregate for molding of the present invention.

Method for Mulling

The blended aggregate for molding of the present invention is prepared by mixing the above compositions. The sequences to add them and the method for mulling them are not limited. For example, the binder and the specific lithium salt may be first mixed to prepare the binder composition for molding. Then the binder composition for molding is mixed with the aggregate. This is a preferable process. A muller for mulling the mixture that is prepared by adding the binder composition for molding and other compositions to the aggregate is not limited, and may be a known muller, such as a rotating- and revolving-type mixer, an Eirich intensive mixer, and a Sinto Simpson mix muller.

To prepare the blended aggregate for molding of the present invention, the binder and the specific lithium salt are not necessarily mixed first. For example, the binder may be added to the aggregate to be mulled. Then the specific lithium salt may be added to them to be mulled to prepare the blended aggregate for molding of the present invention. Or, the blended aggregate for molding of the present invention may be prepared by adding the specific lithium salt to the aggregate to mull them, and by adding the binder to them and mulling them. Or, three materials may be mulled one time to prepare the blended aggregate for molding of the present invention. Incidentally, the same muller as discussed above can be preferably used for these operations.

Method for Manufacturing Mold Made of Aggregate

A mold made of the aggregate that uses the blended aggregate for molding of the present invention may be manufactured by means of a molding machine or by hand ramming.

However, it is preferable to mix and agitate the water-soluble binder, the aggregate, the specific lithium salt, and so on, and to foam them to prepare foamed and blended aggregate. The foamed and blended aggregate is filled into a cavity for manufacturing a casting mold by means of pressure, which cavity is already heated. It is more preferably injected into the cavity when being filled by means of pressure.

Specifically, a mold is preferably manufactured by a method that includes the following steps, a) to d):

a) step for preparing foamed and blended aggregate by agitating blended aggregate that contains the aggregate, the water-soluble binder, the specific lithium salt, and water, so that bubbles are generated in the blended aggregate, b) step for filling the foamed and blended aggregate into a cavity for manufacturing a casting mold in a metal mold, c) step for manufacturing the casting mold made of the aggregate by evaporating moisture in the foamed and blended aggregate that has been filled in the cavity so as to solidify the foamed and blended aggregate, and d) step for taking the mold made of the aggregate out of the cavity.

In the foamed and blended aggregate that has been filled in the cavity for manufacturing a casting mold in the metal mold that is heated, the bubbles are dispersed in it by agitation and vapor is generated by the heat of the metal mold from moisture in the foamed and blended aggregate. The bubbles and the vapor tend to gather at the center of the mold. Thus, the mold has a low bulk density of the aggregate, the water-soluble binder, and the specific lithium salt, i.e., a low density of solids, near the center, and a high bulk density near the surface. Since moisture or water is generally absorbed from the surface of the mold, the specific lithium salt is preferably located near the surface in the mold made of the aggregate. Since the surface of the mold that is manufactured by filling the foamed and blended aggregate into the cavity of the casting mold that is already heated has a high density, the specific lithium salt to be added can be significantly reduced.

To see if the bulk density near the center is lower than that near the surface of the mold, the status of the packed solids (the aggregate, the binder, and the specific lithium salt) on the section near the center and on the surface can be visually checked.

To improve the ability to pack the blended aggregate into the cavity for manufacturing a casting mold and to improve the bulk density that is discussed above, the blended aggregate is preferably foamed to be like whipped cream. Specifically, the foamed and blended aggregate, i.e., the blended aggregate for molding, has preferably a viscosity that equals 0.5 Pa·s or more and 10 Pa·s or less, more preferably 0.5 Pa·s or more and 8 Pa·s or less. The viscosity of the foamed and blended aggregate, i.e., the blended aggregate for molding, is measured as follows:

Method for Measuring

The foamed and blended aggregate is put in a cylindrical vessel, with an inside diameter of 42 mm. A small hole with a diameter of 6 mm is formed on the bottom. It is pressed by means of a columnar weight with a weight of 1 kg and a diameter of 40 mm, to be discharged through the small hole. The period of time for the weight to move 50 mm is measured. The viscosity is calculated by this formula.

$$\mu = \pi D^4 P_\mu t / 128 L_1 L_2 S \quad \text{Formula:}$$

where $\mu$: the viscosity [Pa·s],
D: the diameter of the small hole on the bottom [m],
$P_\mu$: the pressing force of the weight [Pa],
t: the period of time for the weight to move 50 mm [s],
$L_1$: the distance that the weight moves (=50 mm),
$L_2$: the length of the small hole on the bottom [m], and
S: the mean value of the area of the bottom of the columnar weight and the sectional area of the hollow region inside the cylinder, i.e., the inside area [m$^2$].

As a method for filling the foamed and blended aggregate into the cavity for manufacturing a casting mold, direct pressure by means of a piston within a cylinder, supplying compressed air to the inside of the cylinder, pressure by means of a screw, pouring, etc., can be used. Among these methods, direct pressure by means of a piston within a cylinder, and supplying compressed air to the inside of the cylinder, are preferable in view of the speed of filling and the stability in filling achieved by the uniformity of the pressure applied to the foamed and blended aggregate The moisture in the foamed and blended aggregate that has been filled in the cavity for manufacturing a casting mold is evaporated by heat from the heated metal mold, by the heated air that flows into the cavity for manufacturing a casting mold, or by both.

Manufacturing Casting Mold by Using Mold Made of Aggregate

The mold that is made of the blended aggregate for molding of the present invention can be used for casting various metals and alloys. The materials of molten metal for casting are, for example, the following. (Incidentally, the pouring temperatures as listed below indicate the temperatures that are suitable to melt the materials for pouring.)

Aluminum or an aluminum alloy (pouring temperature: 670° C.-700° C.),

Iron or an iron alloy (pouring temperature: 1,300° C.-1,400° C.),

Bronze (pouring temperature: 1,100° C.-1,250° C.), and

Brass (pouring temperature: 950° C.-1,100° C.).

The molten metal of the materials as listed above is poured into a cavity of a mold (or core) and a casting mold and then cooled. Thereafter the mold is removed. Thus a product is cast.

WORKING EXAMPLE

Below, the present invention is discussed in detail with reference to working examples. However, it is not limited to them. Incidentally, the word "parts" that is used below means "parts by mass," unless otherwise stated.

Test A

Working Example A1 aggregate: natural aggregate 100 parts
(Flattery sand, available from Cape Flattery Silica Mines, Australia)
water-soluble binder: sodium silicate 2.0 parts
(Liquid glass with a mole ratio of 2.0, i.e., No. 1, available from Fuji Kagaku Corporation, Japan)
foamable water-soluble binder: anionic surfactant 0.05 parts
(Ether sulfate sodium salt, available from ADEKA Corporation, Japan)
lithium salt: lithium silicate 0.5 parts
(Lithium silicate 45 with a mole ratio of 4.5, available from Nippon Chemical Industrial Co., Ltd., Japan)

The material as listed above was mixed by a mixer (Tabletop mixer, available from Aicohsha Manufacturing Co., Ltd., Japan) at a speed of about 200 rpm for about five minutes, to be foamed, so that a foamed mixture is prepared. Then, the foamed mixture was injected by a molding machine (Molding Machine, available from Sintokogio, Ltd., Japan) into a metal mold that is heated to 250° C. The metal mold is a mold for manufacturing a test piece for bending strength and has a cavity with a volume of about 80 cm$^3$. The foamed mixture was injected at a speed at the gate of 1 m/sec and at a surface pressure in the cylinder of 0.4 MPa. The foamed mixture was kept in the heated metal mold for two minutes, to evaporate moisture in it by the heat of the metal mold, to thereby solidify. After it solidified, the mold (or core) was taken out of the metal mold.

—Evaluation by Test—

Moisture Resistance Tests

Test pieces for bending that were 10 mm×10 mm×70 mm were manufactured from the mold. They were kept in a temperature- and humidity-testing chamber at a temperature of 35° C. and a humidity of 75% for 72 hours. The bending strengths (MPa) of the test pieces were measured every 24 hours from 0 hour. The bending strengths were measured by Testing Method SM-1: Testing method for bending strength; specified by JACT (Japan Association of Casting Technology).

Absorbed Moisture

The absorbed moisture of the test piece that was kept in the temperature- and humidity-testing chamber for 72 hours was measured by Testing Method S-9: Testing method for moisture in aggregate for molding; specified by JACT.

Water Resistance Tests

The test pieces for bending were dipped in a water-based coating (processing liquid that contains fine powder of ceramics and an aqueous medium, available from Mikawa Kousan Co., Ltd., Japan, product name: Three Coats WS-180) and then kept in a drying oven at 100° C. The bending strengths (MPa) of the test pieces were measured every 15 minutes up to 60 minutes. The bending strengths were measured by the above method.

Working Examples A2-A6

The molds (or cores) were manufactured in the same way as working example A1, except for changing the kind, mole ratio, and amount of lithium salt to those as listed in Table 1 below. Then evaluations by tests were performed.

Comparative Example A1

The mold (or core) was manufactured in the same way as the working example A1, except that no lithium salt (lithium silicate) was added. Then an evaluation by a test was performed.

TABLE 1

| Test A | lithium salt | | | moisture resistance test/ bending strength (MPa) | | | | absorbed moisture | water resistance test/ bending strength (MPa) | | | | |
|---|---|---|---|---|---|---|---|---|---|---|---|---|---|
| | | mole ratio | parts | 0 Hr | 24 Hr | 48 Hr | 72 Hr | (%) | No coat | 15 min | 30 min | 45 min | 60 min |
| Working Example A1 | lithium silicate | 4.5 | 0.5 | 3.9 | 3.9 | 4.0 | 3.8 | 0.05 | 3.9 | 2.0 | 1.9 | 1.6 | 3.7 |
| Working Example A2 | lithium silicate | 7.5 | 0.5 | 3.8 | 3.9 | 3.8 | 3.7 | 0.05 | 3.9 | 2.2 | 2.0 | 2.0 | 3.6 |
| Working Example A3 | lithium silicate | 3.5 | 0.5 | 3.8 | 3.8 | 3.9 | 3.8 | 0.05 | 3.8 | 2.3 | 1.8 | 1.9 | 3.6 |
| Working Example A4 | lithium silicate | 4.5 | 0.05 | 4.0 | 3.8 | 3.7 | 3.5 | 0.20 | 3.8 | 1.5 | 1.2 | 1.0 | 3.3 |
| Working Example A5 | lithium silicate | 4.5 | 0.01 | 4.0 | 3.8 | 3.6 | 3.3 | 0.30 | 3.8 | 1.3 | 1.0 | 0.7 | 3.0 |
| Working Example A6 | lithium hydroxide | — | 0.05 | 3.5 | 3.2 | 3.0 | 2.8 | 0.35 | 3.5 | 1.4 | 1.0 | 1.1 | 2.7 |
| Comparative Example A1 | None | | | 4.1 | 3.2 | 2.6 | 2.0 | 0.40 | 4.1 | 1.1 | 0.8 | 0.4 | 2.8 |

Results of Test A—

Figure 1:
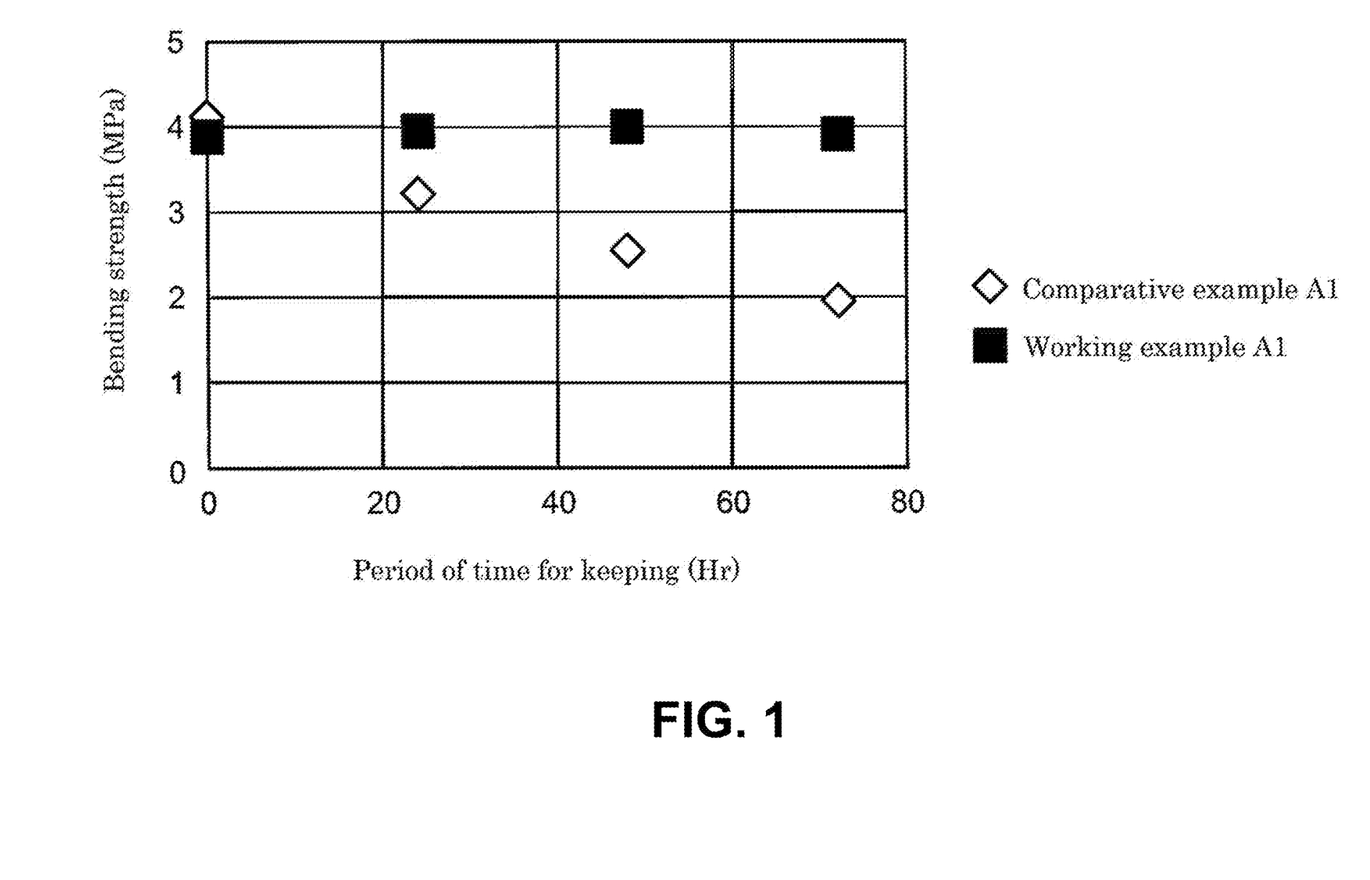
FIG. 1 is a graph showing the results from testing the moisture resistances of a working example A1 and a comparative example A1.
Figure 2:
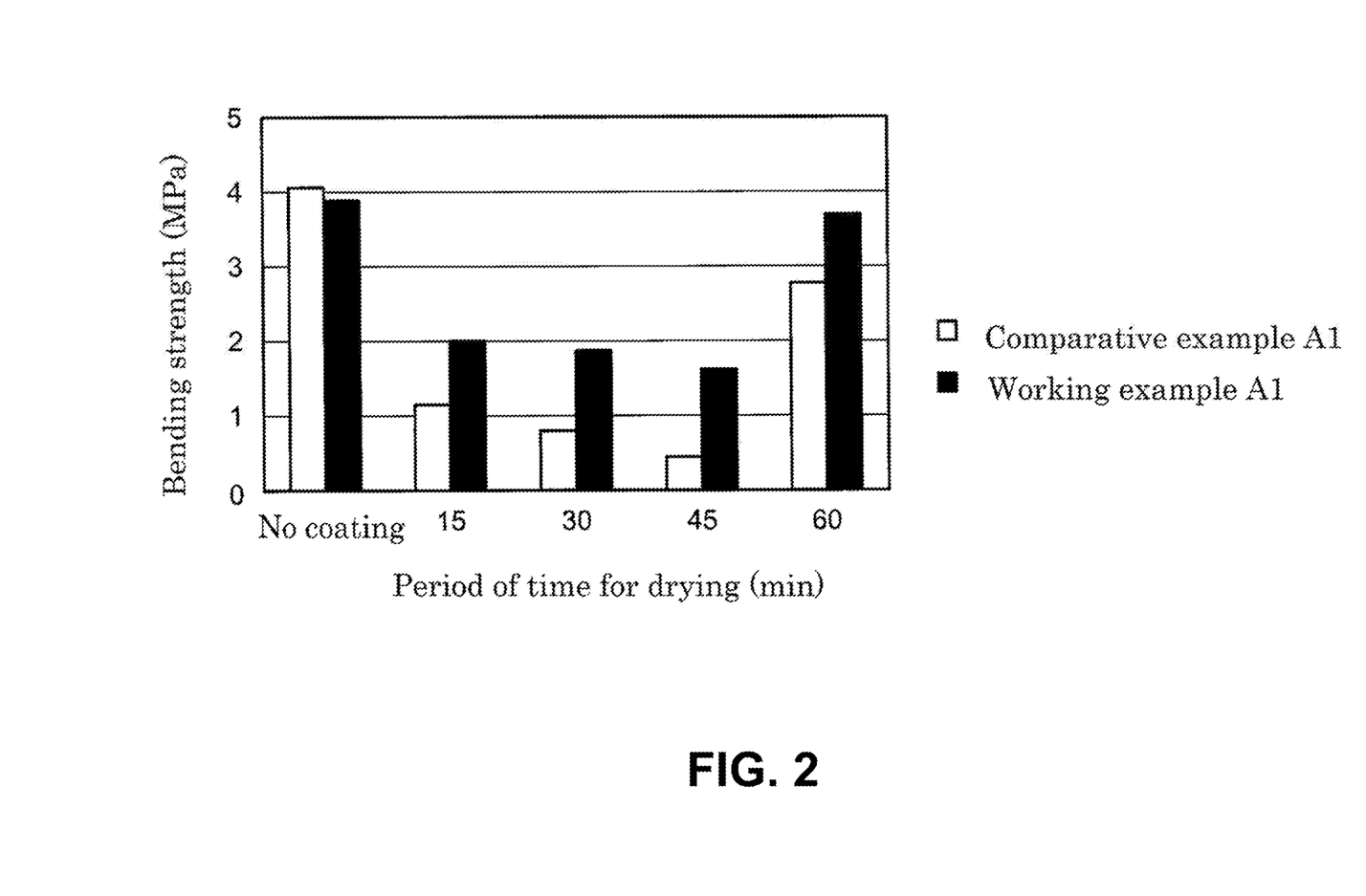
FIG. 2 is a graph showing the results from testing the water resistances of the working example A1 and the comparative example A1.

The results for testing the moisture resistances of the bending test pieces (the working example A1 and the comparative example A1) are shown in FIG. 1. The comparative example A1, where no lithium silicate is contained, shows that the bending strength, after being kept for 72 hours, drops to about 50% of that at 0 hour. In contrast, the working example A1, where lithium silicate is contained, shows that no bending strength drops. The results of water resistance tests (the working example A1 and the comparative example A1) are shown in FIG. 2. The comparative example A1, where no lithium silicate is contained, shows that the bending strengths of the test pieces that are not sufficiently dried, i.e., dried from 0 to 45 minutes, significantly drop to about 10% of that of the test piece with no coating. The bending strength of the test piece that is dried for 60 minutes recovers, but is 70% of that of the test piece with no coating. In contrast, the working example A1, where lithium silicate is contained, shows that the bending strengths of the test pieces that are not sufficiently dried, i.e., dried from 0 to 45 minutes, drop to about 40% of the bending strength of the test piece with no coating. The bending strength of the test piece that is dried for 60 minutes recovers, and is 90% of that of the test piece with no coating.

Test B

Working Example B1 aggregate: artificial aggregate 100 parts
(Espearl #60L, available from Yamakawa Sangyo Co., Ltd., Japan)
water-soluble binder: sodium silicate 1.0 parts
(Potassium silicate No. 1 with a mole ratio of 1.8-2.2, available from Fuji Kagaku Corporation, Japan)
foamable water-soluble binder: anionic surfactant 0.025 parts
(Ether sulfate sodium salt, available from ADEKA Corporation, Japan)
lithium salt: lithium silicate 0.25 parts
(Lithium silicate 45 with a mole ratio of 4.5, available from Nippon Chemical Industrial Co., Ltd., Japan)
The molds (or cores) were manufactured, and then evaluations by tests were performed in the same way as Working Example 1, except for using the above compositions.

Working Examples B2-B6

The molds (or cores) were manufactured in the same way as working example B1, except for changing the kind, mole ratio, and amount of lithium salt to those as listed in Table 2 below. Then evaluations by tests were performed.

Comparative Example B1

Figure 4:
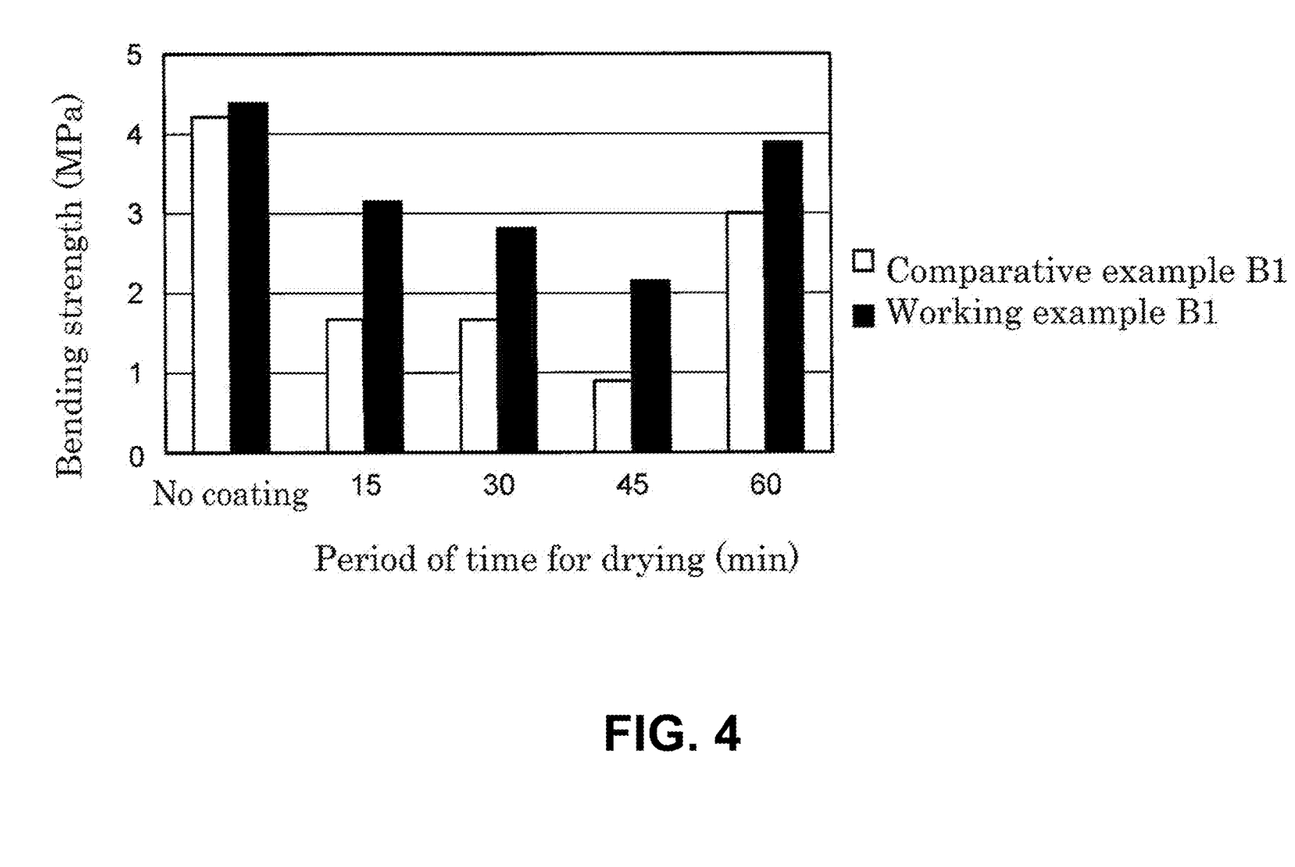
FIG. 4 is a graph showing the results from testing the water resistances of the working example B1 and the comparative example B1.

The mold (or core) was manufactured in the same way as the working example B1, except that no lithium salt (lithium silicate) was added. Then an evaluation by a test was performed.

working example B1, where lithium silicate is contained, shows that no bending strength drops. The results of water resistance tests (the working example B1 and the comparative example B1) are shown in FIG. 4. The comparative example B1, where no lithium silicate is contained, shows that the bending strengths of the test pieces that are not sufficiently dried, i.e., dried from 0 to 45 minutes, significantly drop to about 20% of the bending strength of the test piece with no coating. The bending strength of the test piece that is dried for 60 minutes recovers, but is 70% of that of the test piece with no coating. In contrast, the working example B1, where lithium silicate is contained, shows that the bending strengths of the test pieces that are not sufficiently dried, dried from 0 to 45 minutes, drop to about 50% of the bending strength of the test piece with no coating. The bending strength of the test piece that is dried for 60 minutes recovers, and is 90% of that of the test piece with no coating.

Below, the lithium salts that are listed in Tables 1 and 2 are detailed.

the lithium silicate (Lithium silicate 45 with a mole ratio of 4.5, available from Nippon Chemical Industrial Co., Ltd., Japan)

the lithium silicate (Lithium silicate 75 with a mole ratio of 7.5, available from Nippon Chemical Industrial Co., Ltd., Japan)

the lithium silicate (Lithium silicate 35 with a mole ratio of 3.5, available from Nippon Chemical Industrial Co., Ltd., Japan)

the lithium hydroxide (Lithium hydroxide in hydrate form, available from Kishida Chemical Co., Ltd., Japan)

The invention claimed is:

1. A binder composition for molding containing:
    a water-soluble binder;
    lithium silicate, wherein a mole ratio of the lithium silicate at $SiO_2/Li_2O$ equals 3.0 or more and 8.0 or less; and
    a water-soluble foaming agent.

TABLE 2

| Test B | lithium salt | | | moisture resistance test/ bending strength (MPa) | | | | absorbed moisture | water resistance test/ bending strength (MPa) | | | | |
|---|---|---|---|---|---|---|---|---|---|---|---|---|---|
| | | mole ratio | parts | 0 Hr | 24 Hr | 48 Hr | 72 Hr | (%) | No coat | 15 min | 30 min | 45 min | 60 min |
| Working Example B1 | lithium silicate | 4.5 | 0.25 | 4.3 | 4.3 | 4.4 | 4.2 | 0.05 | 4.3 | 3.1 | 2.8 | 2.1 | 3.9 |
| Working Example B2 | lithium silicate | 7.5 | 0.25 | 4.4 | 4.3 | 4.3 | 4.1 | 0.05 | 4.4 | 3.4 | 3.4 | 3.3 | 3.7 |
| Working Example B3 | lithium silicate | 3.5 | 0.25 | 4.3 | 4.1 | 4.2 | 4.2 | 0.05 | 4.3 | 2.9 | 3.2 | 3.3 | 3.7 |
| Working Example B4 | lithium silicate | 4.5 | 0.05 | 4.0 | 4.2 | 3.9 | 3.8 | 0.2 | 4.0 | 3.0 | 2.8 | 2.0 | 3.5 |
| Working Example B5 | lithium silicate | 4.5 | 0.01 | 4.2 | 3.9 | 3.8 | 3.5 | 0.25 | 4.2 | 2.9 | 3.0 | 2.0 | 3.0 |
| Working Example B6 | lithium hydroxide | — | 0.05 | 3.7 | 3.4 | 3.3 | 2.9 | 0.2 | 3.7 | 3.1 | 2.9 | 2.5 | 3.4 |
| Comparative Example B1 | None | | | 4.1 | 3.6 | 2.9 | 2.1 | 3.0 | 4.1 | 1.7 | 1.7 | 0.9 | 3.0 |

Results of Test B—

Figure 3:
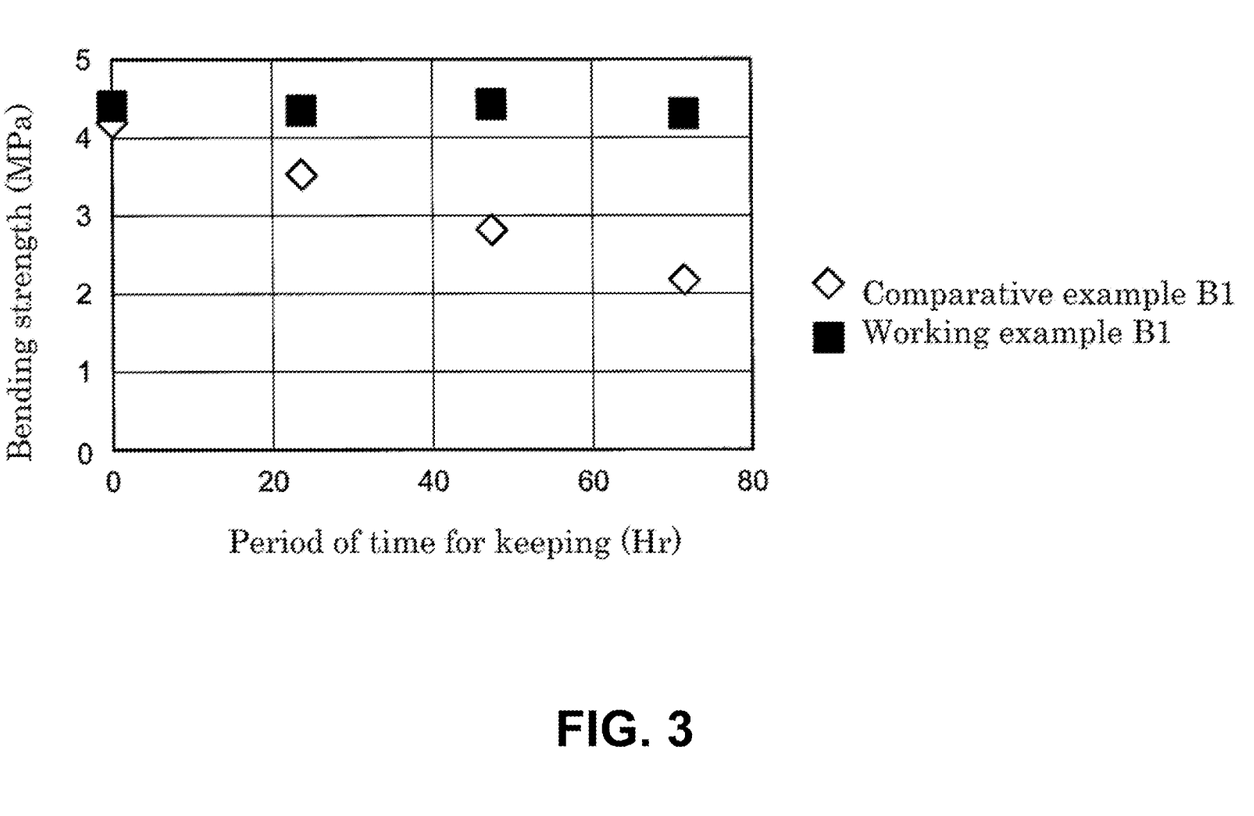
FIG. 3 is a graph showing the results from testing the moisture resistances of a working example B1 and a comparative example B1.

The results for testing the moisture resistances of the bending test pieces (the working example B1 and the comparative example B1) are shown in FIG. 3. The comparative example B1, where no lithium silicate is contained, shows that the bending strength, after being kept for 72 hours, drops to about 50% of that at 0 hour. In contrast, the 2. The binder composition for molding of claim 1, wherein a mole ratio of the lithium silicate at $SiO_2/Li_2O$ equals 3.0 or more and 5.0 or less.

3. The binder composition for molding of claim 1, containing at least one kind of the water-soluble binder that is selected from a group of sodium silicate and potassium silicate.

4. The binder composition for molding of claim 1, containing a surfactant as the water-soluble foaming agent.

5. The binder composition for molding of claim 4, containing at least one kind of the surfactant that is selected from a group of an anionic surfactant, a non-ionic surfactant, and an amphoteric surfactant.

6. Blended and foamed aggregate for molding containing:
   aggregate;
   a water-soluble binder;
   lithium silicate, wherein a mole ratio of the lithium silicate at $SiO_2/Li_2O$ equals 3.0 or more and 8.0 or less; and
   a water-soluble foaming agent.

7. The blended and foamed aggregate for molding of claim 6, wherein a mole ratio of the lithium silicate at $SiO_2/Li_2O$ equals 3.0 or more and 5.0 or less.

8. The blended and foamed aggregate for molding of claim 6, containing at least one kind of the water-soluble binder that is selected from a group of sodium silicate and potassium silicate.

9. The blended and foamed aggregate for molding of claim 6, containing a surfactant as the water-soluble foaming agent.

10. The blended and foamed aggregate for molding of claim 9, containing at least one kind of the surfactant that is selected from a group of an anionic surfactant, a non-ionic surfactant, and an amphoteric surfactant.

11. The blended and foamed aggregate for molding of claim 6, wherein a content of the lithium silicate equals 0.01 mass % or more and 1 mass % or less in comparison to a content of the aggregate.

12. The blended and foamed aggregate for molding of claim 6, wherein a content of the water-soluble binder equals 0.1 mass % or more and 20 mass % or less in comparison to a content of the aggregate.

13. The blended and foamed aggregate for molding of claim 6, wherein a content of the foaming agent equals 0.005 mass % or more and 0.1 mass % or less in comparison to a content of the aggregate.

14. The blended and foamed aggregate for molding of claim 6, including bubbles that are generated by foaming and having a viscosity that equals 0.5 Pa·S or more and 10 Pa·S or less.

15. A method for manufacturing a mold made of aggregate that comprises, aggregate;

a water-soluble binder;

lithium silicate, wherein a mole ratio of the lithium silicate at $SiO_2/Li_2O$ equals 3.0 or more and 8.0 or less; and a water-soluble foaming agent; the method comprising the steps of:

mixing and agitating the aggregate, the water-soluble binder, the lithium silicate, and the water-soluble foaming agent, to foam them, and filling the foamed and blended aggregate into a cavity for manufacturing a casting mold.

* * * * *